April 16, 1935.   E. E. ANDERSON ET AL   1,998,113
REAMER
Filed April 18, 1932   2 Sheets-Sheet 1
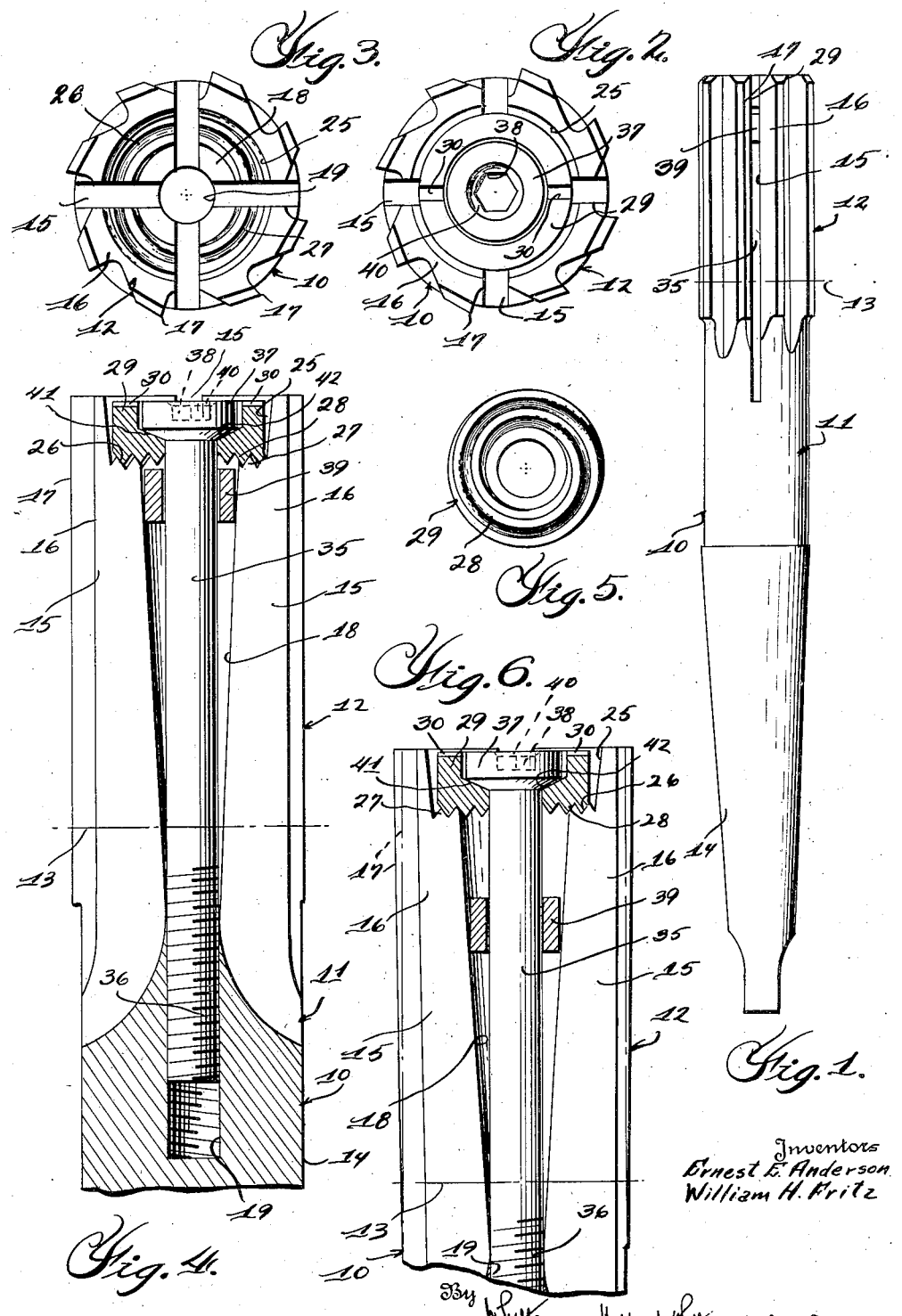

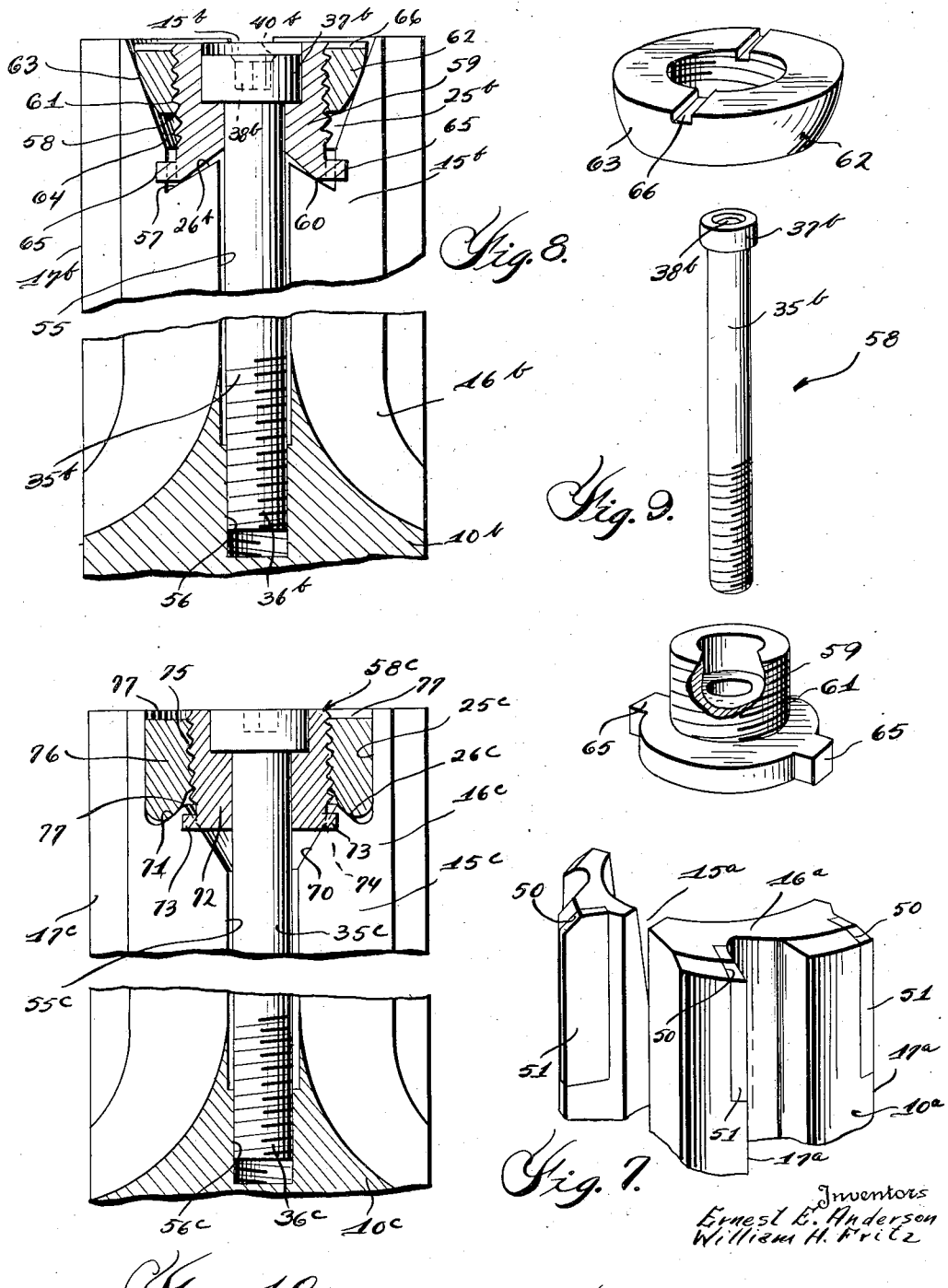

Patented Apr. 16, 1935

1,998,113

UNITED STATES PATENT OFFICE 1,998,113

REAMER

Ernest E. Anderson and William H. Fritz, Detroit, Mich., assignors to Goddard & Goddard Company, Detroit, Mich., a corporation of Michigan Application April 18, 1932, Serial No. 605,982

4 Claims. (Cl. 77—76)

This invention relates generally to tools and has particular reference to a tool adapted for use in sizing or otherwise working on an internal surface.

One of the primary objects of this invention is to provide a tool of the above mentioned character which will have cutting edges which may be expanded and to provide means for tying together the free ends of these cutting edges to thus strengthen the cutting end of the tool so that the tool will be adapted not only for light cutting operations, but also for rough cutting operations which have heretofore required the use of a solid tool.

The invention further contemplates the provision of an adjusting means for a tool of the above mentioned character by which a controlled and accurate adjustment of the cutting edges may be obtained.

Still further the invention contemplates the provision of a tool of the above mentioned character which will be so formed that the cutting edges thereof may be expanded to a substantial extent without danger of cracking or breaking the metal of these cutting edges.

Numerous other objects and advantages of this invention will become more apparent as the following description proceeds, particularly when reference is had to the accompanying drawings wherein:

Fig. 1 is an elevational view of a cutting tool constructed in accordance with the teachings of this invention;

Fig. 2 is an end elevational view of the tool shown in Fig. 1;

Fig. 3 is a view similar to Fig. 2 showing a portion of the adjusting mechanism for the cutting edges removed;

Fig. 4 is a longitudinal sectional view through a portion of the tool;

Fig. 5 is a bottom plan view of one of the elements forming a part of the adjusting mechanism;

Fig. 6 is a semi-diagrammatic sectional view similar to Fig. 4 showing the cutting edges of the cutting tool expanded;

Fig. 7 is a fragmentary perspective view of a slightly modified form of construction;

Fig. 8 is a view similar to Fig. 4 showing a modified form of adjusting mechanism;

Fig. 9 is a perspective view with parts spaced apart of one of the elements forming a part of the structure shown in Fig. 8; and Fig. 10 is a view similar to Fig. 4 showing a further modified form of adjusting means.

Referring then particularly to the drawings wherein like reference characters designate corresponding parts throughout all views, the tool is shown as comprising a cylindrical body designated generally by the reference character 10. According to the teachings of this invention, this cylindrical body is formed of two sections designated generally by the reference characters 11 and 12, these sections being formed respectively of alloy steel and tool steel. These sections are shown butt welded together at the line 13 for a purpose which will hereinafter be more fully described.

The shank 14 of the tool is formed on one end of the cylindrical body member, this shank being suitably shaped for engagement in a tool holder of any desired character (not shown). The cutting end of the tool body is longitudinally slotted as at 15 to provide the lands 16, and these lands are in turn fluted, as clearly illustrated, to form the cutting edges 17. While the cutting edges are shown as being straight, it will be obvious that these edges may be spirally formed, the slots 15 in this event being correspondingly shaped. The cutting end of the tool is further bored to provide a tapered bore 18 which terminates at its lower end in a threaded socket 19, this socket extending below the lower extremities of the slots 15.

With the cutting end of the tool slotted in the manner above described, it will be apparent that the lands carrying the cutting edges may be expanded to adjust the cutting diameter of the tool. It constitutes a feature of this invention that the slots 15 extend downwardly entirely through the portion 12 of the tool body and into the portion 11 of the tool body, as clearly illustrated in Figs. 1 and 4 of the drawings.

As brought out before, the body 11 of the tool is formed preferably of alloy steel, and this term is to be construed as meaning a steel which is not hardened when heat treated. There are numerous steels of this character commercially available, these steels frequently containing nickel, vanadium, molybdenum or chromium, and being low in carbon content. They are characterized by their toughness after being heat treated, the heat treating of these types of steel rendering the same extremely tough rather than brittle or hard.

The tool steel, however, of which the portion 12 of the tool is formed differs from the steel of the body in that it becomes hard when heat treated, which is necessary for the cutting edges. It is preferable not to form the entire tool body of this steel, first because of the brittleness of this steel when heat treated, and secondly, because of the cost of this steel.

By providing a composite tool body and by extending the slots between the lands of the tool body through the tool steel portion of the body and into the alloy steel portion thereof, it will be apparent that the lands may be expanded a substantial amount without effecting a breaking or cracking of the tool body. The bending or distortion of the lands, taking place as it does at the lower ends of these lands is permitted by the toughness of the alloy steel body portion of the tool, in which portion of the tool body this distortion occurs. The tool steel portion of the body is therefore not itself directly subjected to bending or distortion, with the result that the tool steel portion of the tool is not cracked or broken upon expansion of the tool.

For the purpose of adjusting the tool, the bore 18 is enlarged at its upper end, as designated by the reference character 25, this enlargement forming an annular shoulder 26 on the inner surfaces of the lands adjacent the free ends thereof. This shoulder is provided with the spiral threads 27 which are adapted to be engaged by spiral threads 28 formed on the under face of a scroll 29 which is adapted to be loosely received in the enlarged portion 25 of the bore. The upper face of the scroll is provided at spaced points such, for example, as diametrically opposite points with the grooves or recesses 30 adapted to be engaged by a suitable tool (not shown) for effecting a rotation of the scroll.

The scroll 29 is bored to loosely receive the shank 35 of a locking member or bolt, the lower end of this shank being threaded as at 36 to engage in the threaded socket 19. The upper end of this locking member or bolt is provided with a head 37 loosely engageable in a recess or counterbore formed in the upper face of the scroll, and this head is in turn provided with a wrench-receiving socket such, for example, as the hexagonal socket 38. A sleeve 39 loosely embraces the shank of the bolt 35 and engages the walls of the bore 18 for a purpose which will hereinafter be more fully described.

In operation and with the tool in non-expanded position, expansion may be effected by first loosening the bolt 35 to permit a free rotation of the scroll 29. With the bolt loosened a suitable tool is then engaged in one of the openings 30 of the scroll, and this scroll is then rotated to adjust the threads thereon relative to the threads on the shoulders 26. It will be understood that during this rotative adjustment of the scroll the lands of the tool will not be adjusted since because of the fact that the scroll is loose, the threads on the scroll may ride slightly upwardly on the threads on the shoulders. For the purpose of adjusting the scroll to expand the lands, the scroll should be rotated in such a direction that the outer faces of the threads on the scroll will remain in engagement with the inner faces of the threads on the shoulders in the manner clearly illustrated in Fig. 4 of the drawings.

When the scroll has been adjusted to a desired position, the bolt 35 will then be tightened to force the scroll downwardly and to urge the threads thereon into firm engagement with the threads on the shoulders. The threads on the scroll will thus act as wedges and engaging as they do the threads on the lands, will urge the lands outwardly or to expanded position. Further, when the bolt has been tightened sufficiently to force the threads on the scroll into firm engagement with the threads on the lands it will be apparent that the faces on the threads on both the scroll and lands will then be in firm engagement with each other with the result that the lands will not only be moved to expanded position, but will also be tied or locked in this expanded position.

If, during this expanding operation the tool is held in a substantially vertical position with the cutting end upwardly, the sleeve 39 will slip downwardly in the tapered bore 18 in the manner illustrated in Fig. 6 of the drawings. This sleeve will thus hold the lands in expanded position so that if now, for the purpose of further expanding the tool, the bolt is loosened, the scroll will not be forced upwardly out of engagement with the threads on the shoulders. Thus if the bolt is loosened after the tool has been expanded, a further expansion may be effected by again rotatively adjusting the scroll while the same is loose and then subsequently again drawing the scroll downwardly to firmly engage its threads with the threads on the shoulders. It will thus be apparent that the lands may be adjusted or expanded in a series of increments, the sleeve 39 in each case holding the lands in their previously expanded position during the next adjustment of the scroll. Rotative adjustment of the scroll may be made in various increments to suit the adjustment desired, but increments should always require less than 180° of scroll rotation to prevent riding on tops of threads.

If it is desired to reduce the cutting diameter of the tool, this may be effected by first loosening the bolt 35 in order that the scroll may be freely adjusted. The scroll will then be rotated in a direction reverse to that previously described so that the inner faces of the threads on the scroll will ride upwardly on the outer faces of the threads on the shoulders. If, after the proper adjustment of the scroll has been made, the locking bolt is then tightened, the threads on the scroll will be wedgingly engaged with the threads on the lands, to draw these lands inwardly and to lock or tie the same in position. During this operation the tool should be inverted, that is, held with its cutting end downwardly so that the sleeve 39 will slide downwardly toward the open end of the bore 18 to thus permit inward movement of the lands.

After a tool of this character has been in use for a certain period of time, it becomes necessary to sharpen the same and during this sharpening operation the tool is in general supported at its ends on supports aligned with the axis of the tool body. For this purpose the open end of the hexagonal socket 38 is chamfered as designated by the reference character 40 to provide for its engagement with a suitable support. Further, the lower face of the head of the clamping bolt is preferably tapered as at 41 to cooperate with a correspondingly tapered surface 42 formed on the inner face of the scroll, with the result that when the bolt is tightened the bolt will be centered in the scroll, and the scroll in turn being centered in the tool by engagement of its threads with the threads on the lands, the bolt will thus be centered with respect to the tool body. Thus the hexagonal socket will itself be aligned with the axis of the tool to provide for supporting of the tool during the sharpening operation.

From the above it will be apparent that the invention provides for a controlled and accurate adjustment of the cutting edges of the tool, since the scroll may be rotated any fraction to accomplish the desired adjustment. When the scroll is locked in engaged position with the threads on the lands, the free ends of these lands are rigidly tied together, with the result that the free or cutting end of the tool is positively locked to the size desired and also considerably strengthened. This strengthening of the cutting end of the tool permits the forming of longer slots 15 in the tool, with the result that the lands may be more readily adjusted and may be adjusted to a greater degree. The tying together or locking of the cutting end of the tool, distributing and transferring the torque to a point directly at the point of cutting, renders the tool sufficiently strong that it may be used for rough boring or broaching operations, thus performing operations which have heretofore required the use of solid or non-expansible tools. It might be noted further that the tying together or locking of the cutting end of the tool will be of particular advantage when the tool is formed with spiral cutting edges since during use of a tool having cutting edges formed in this manner there is a considerable force exerted on the ends of the cutting edges tending to draw the same radially outwardly or to expanded position.

It will be apparent further that since the slots in the tool may be extended entirely through the tool steel portion of the tool and into the alloy steel portion thereof where the metal is tough rather than brittle, a substantial expansion of the reamer may be effected without the danger of cracking or breaking the cutting end of the reamer. Thus the invention provides an expanding means capable of effecting a substantial expansion of a reamer or the like together with a reamer construction which may be expanded a substantial amount without danger of cracking or breaking.

In Fig. 7 of the drawings a slightly modified form of construction is illustrated as comprising a cylindrical body 10a which may be formed entirely of tough steel rather than being formed in two sections in the manner previously described. This cylindrical body will be provided with the slots 15a forming the lands 16a which in turn are fluted in the manner previously described, to form the edges 17a. The free ends of these edges are, however, in this instance provided with recesses 50, and fixed in these recesses are inserts 51 of hard alloy such as tungsten carbide, stellite or the like.

Thus in this modified form of construction the cutting edges are tipped with hard alloy inserts by which the cutting is effected. As in the previously described form of construction, the distortion of the lands takes place in the tough body portion of the tool, with the result that the cutting edges may be radially expanded to a substantial amount without effecting a breaking of the tool body. The adjusting means previously described may be associated with this modified form of tool, and in this case the tying together of the free ends of the lands by the adjusting mechanism will be of particular advantage since it will prevent jarring and chattering of the free ends of the lands and thus of the hard alloy inserts. It is important that these inserts be shielded against severe shocks and chattering to prevent the same from cracking and chipping.

In Figs. 8 and 9 there is disclosed a modified form of adjusting means which may be substituted for the adjusting means previously described, it being understood that the adjusting means about to be described may be associated either with a tool such as disclosed in Figs. 1 to 6 of the drawings or with a tool such as disclosed in Fig. 7 of the drawings. The tool illustrated in Fig. 8 is shown as comprising a cylindrical body 10b provided at its cutting end with the slots 15b forming lands 16b which in turn are fluted in the manner previously described to form the cutting edges 17b. This end of the tool is also bored to provide a bore 55 which corresponds to the bore 18 but which need not be tapered as is the bore 18. The bore 55 is provided at its inner end with a threaded portion 56 for receiving the threaded end 36b of a locking or tie bolt 35b.

The outer end of the bore 55 is counterbored to form the shoulders 26b on the lands adjacent the free ends thereof. These shoulders are not, however, threaded, but are merely inclined or tapered downwardly from their inner free edges. This tapering or inclining of the shoulders forms on the same the cam faces 57 for a purpose which will hereinafter be more fully described.

Mounted in the recess 25b which is formed at the end of the bore 55 is a composite adjusting member designated generally by the reference character 58. This member comprises an inner sleeve 59 provided at its lower end with a bearing portion 60 adapted for line contact with the cam faces 57 on the lands. The outer surface of the sleeve 59 is threaded as at 61 to adjustably receive a ring 62, and this ring is provided with a portion 63 adapted for line contact with outwardly flaring or tapered cam surfaces 64 formed on the lands above the surfaces 57.

The sleeve 59 is bored to loosely receive the shank of the bolt 35b and is counterbored to loosely receive the head 37b of this bolt. As in the first described form of construction the head of the bolt is provided with a hexagonal socket 38b which may be chamfered as at 40b in the manner previously described. The sleeve 59 is further provided adjacent its lower end with lateral projections 65 adapted to engage the slots 15b of the tool body. The upper face of the ring 62 is provided with spaced recesses 66 with which a tool may be engaged to effect a rotation of this ring and thus an adjustment of the same longitudinally of the member 59.

In this form of construction it will be apparent that the ring 62 engaging as it does the outwardly flared surfaces on the lands constitutes the expanding means of the adjusting mechanism. The means for locking or tying the lands together comprises the sleeve 59 which has the portion 60 which engages the cam surfaces 57 on the lands. Further, the expansion or contraction of the lands will be dependent upon the longitudinal adjustment of the ring 62 on its sleeve 59.

In operation, to expand the tool the bolt 35b may be loosened and the ring 62 then rotated. This rotation of the ring will by virtue of its threaded engagement with the sleeve 59 effect an adjustment of the ring longitudinally of the sleeve. If, after the desired adjustment of the ring has been effected, the locking bolt is then tightened, the composite member 58 which comprises the sleeve and the ring will be drawn downwardly into the recess 25b, the ring 62 effecting an expansion of the lands and the lower end of the sleeve effecting a tying or locking of the lands in expanded position. It will be obvious that with this construction the expansion need not be effected in a series of increments since the ring 62 may be adjusted any desired amount longitudinally of the sleeve 59 to effect the desired expansion of the cutting edges of the tool.

This adjusting means may also be operated to effect a reduction in the cutting diameter, this being effected by first loosening the bolt 35ᵇ so that the ring 62 may be freely rotated. The ring will then be rotated to adjust the same outwardly on the sleeve 59 after which the bolt may be tightened, the lower portion of the sleeve 59 acting on the cam surfaces 57 to draw the lands until their surfaces 64 engage the portion 63 of ring 62. During both the expanding and contracting operations the sleeve 59 will be prevented from rotating by virtue of the projections 65 which engage in the slots in the tool body.

In Fig. 10 of the drawings a further modified form of construction is disclosed which is substantially the reverse of that above described. In this form of construction the tool body 10ᶜ is provided with the longitudinal slots 15ᶜ to form the lands 16ᶜ, these lands being fluted to form the cutting edges 17ᶜ. This end of the tool is also bored to form the bore 55ᶜ which terminates at its lower end in a threaded portion 56ᶜ for threadedly receiving the end 36ᶜ of the bolt 35ᶜ.

In this form of construction the end of the tool is counterbored to form the recess 25ᶜ which forms shoulders 26ᶜ on the lands. Each shoulder is provided on its inner free edge with a cam surface 70 which extends upwardly and outwardly and joins a second cam surface 71 which extends downwardly and outwardly. These cam surfaces are adapted to be engaged by portions of a composite adjusting member 58ᶜ which is mounted in the recess 25ᶜ.

The composite adjusting member comprises an inner member 72 having projections 73 engageable in the slots 15ᶜ whereby this inner member is prevented from rotating. This inner member is provided adjacent its inner end with a surface 74 adapted to have line contact with the cam surfaces 70 to urge the lands outwardly.

The member 72 is threaded as at 75 to threadedly receive a ring 76 which has a surface 77 adapted to have line contact with the surfaces 71 formed on the lands, this ring thus constituting means for tying the lands in adjusted position. The ring 76 is provided with recesses 77 with which a tool may be engaged to effect a rotation of the ring, and the member 72 is bored and counterbored to loosely receive the shank and head respectively of the bolt 35ᶜ.

In operating this form of adjusting mechanism the ring 76 may be longitudinally adjusted on member 72 while the bolt 35ᶜ is loosened. If then the bolt is tightened the composite member will be drawn inwardly into the recess 25ᶜ to engage its portions 74 and 77 with the cam surfaces 70 and 71 respectively of the lands. The lands will be expanded by the portions 74 of the members 72 and will be tied together in adjusted position by the portions 77 of the member 76. As in the previously described form of adjusting means, the adjustment need not be made in increments, but may be made in a single operation since the ring may be longitudinally adjusted on the member 72 to any desired extent.

It will be noted that in both of the forms of adjusting means shown in Figs. 8, 9 and 10, the locking bolts will when tightened be centered with respect to the lands, thus facilitating the supporting of the tool for the sharpening operation. The cam surfaces on the several members of the composite adjusting means cooperate with the cam surfaces on the lands to center the adjusting means and to thus also center the locking bolt and its head.

From the above it will be apparent that the invention provides broadly a tool including a shank or body portion, radially adjustable cutting edges and a means for adjusting these cutting edges. This means includes a member or members having portions arranged to wedgingly engage suitable cam or thread surfaces on the lands of the tool for adjusting the same and means in the nature of a locking bolt which draws the adjusting member or members into a position where it effects an adjustment of the cutting edges of the tool and locks these edges in adjusted position.

While the invention has been described with some detail and has been particularly described as being incorporated in a reamer construction, it is to be understood that this description is for the purposes of illustration only and is not definitive of the limits of the inventive idea. The construction will find equal utility in many other types of tools such, or example, as expansion taps, boring tools, burnishing tools, broaches, internal swaging tools and in all tools used or sizing holes whether by cutting, rolling, swaging, broaching, burnishing, honing or other methods. The right is therefore reserved to make such changes in the details of construction and arrangement of parts as will fall within the purview of the attached claims.

What we claim as our invention is:

1. In a tool of the class described, a plurality of radially adjustable lands, each of said lands being formed with a pair of cam surfaces, a member engageable with one of the cam surfaces on each land for urging said lands radially outwardly, a second member engageable with the other cam surface on each of said lands for drawing said lands radially inwardly, said members being threadedly engageable with each other whereby they may be longitudinally adjusted with respect to each other to vary their effective engagement with the cam surfaces on the lands, and means for forcibly urging said members as a unit into engagement with the cam surfaces on the lands to adjust the lands and lock the same in adjusted position.

2. In a tool of the class described, a plurality of radially adjustable lands, each of said lands being provided adjacent its free end with a pair of oppositely inclined surfaces, a member having a portion engageable with one of the inclined surfaces on each of said lands for tying said lands together, a second member engageable with the other inclined surface on each of said lands for urging said lands apart, said members being threadedly engageable with each other whereby they may be longitudinally adjusted with respect to each other, and a bolt passing through one of said members for forcibly urging said members as a unit into engagement with the inclined surfaces on said lands.

3. In a tool of the class described, a plurality of radially adjustable lands, each of said lands being provided adjacent its free end with a pair of oppositely inclined surfaces, a member having a portion engageable with but one of the inclined surfaces on each of said lands for urging said lands to expanded position, a second member threaded on said first mentioned member and engageable with the other inclined surface on each of said lands for tying said lands together, and a bolt loosely passing through one of said members for forcing said members into firm engagement with the inclined surfaces on said lands for adjusting said lands and locking the same in adjusted position.

4. In a tool of the class described, a plurality of radially adjustable lands, a member movable longitudinally of said lands for moving the same radially outwardly, a second member connected to said first mentioned member and engageable with said lands to limit the expanding action of said first mentioned member, means providing for the adjustment of said members relative to each other to vary the expansion of said lands incident to longitudinal movement of said first mentioned member, and means for moving both of said members into engagement with the lands.

ERNEST E. ANDERSON.
WILLIAM H. FRITZ.